United States Patent [19]

Hartel

[11] 4,047,681
[45] Sept. 13, 1977

[54] APPARATUS FOR SHORTENING THE STRUT OF A PIVOTALLY RETRACTABLE AIRCRAFT LANDING GEAR DURING GEAR RETRACTION

[75] Inventor: Erwin H. Hartel, Bellevue, Wash.
[73] Assignee: The Boeing Company, Seattle, Wash.
[21] Appl. No.: 643,030
[22] Filed: Dec. 22, 1975
[51] Int. Cl.² ............................................. B64C 25/12
[52] U.S. Cl. ............................................... 244/102 SS
[58] Field of Search ............................... 244/102 R SS

[56] References Cited
FOREIGN PATENT DOCUMENTS
610,698  10/1948  United Kingdom .......... 244/102 SS Primary Examiner—Trygve M. Blix
Assistant Examiner—Barry L. Kelmachter
Attorney, Agent, or Firm—Christensen, O'Connor, Garrison & Havelka

[57] ABSTRACT

In a landing gear of the type that includes a pivotally retractable shock strut, the overall length of the strut is shortened during retraction by a mechanism that is effective to force the shock strut piston to telescope into the shock strut cylinder. The mechanism includes a multiple section, foldable brace which when the landing gear is down functions to rigidify the shock strut and which during retraction folds into a compact, collapsed configuration. One end of the brace is pivotally connected to a collar which in turn is coaxially, rotatably mounted on the strut cylinder, while the other end of the brace is pivotally connected to a support point located on the underside of the wing and offset to one side of the plane of rotation of the strut so that the brace resides at a skewed angle to such plane. As the strut is rotatively retracted, the brace folds toward a collapsed configuration, and because of the brace's skewed mounting location it acts to apply a rotative force to the collar, rotating the collar about the axis of the strut cylinder. A special, reactive linkage is connected between the collar and a modified torque linkage (that interconnects the strut's piston and cylinder), to convert the aforementioned collar rotation into a force moment on one of the links of the torque linkage for telescopically compressing the piston into cylinder and thereby shortening the strut as the gear is retracted.

7 Claims, 6 Drawing Figures

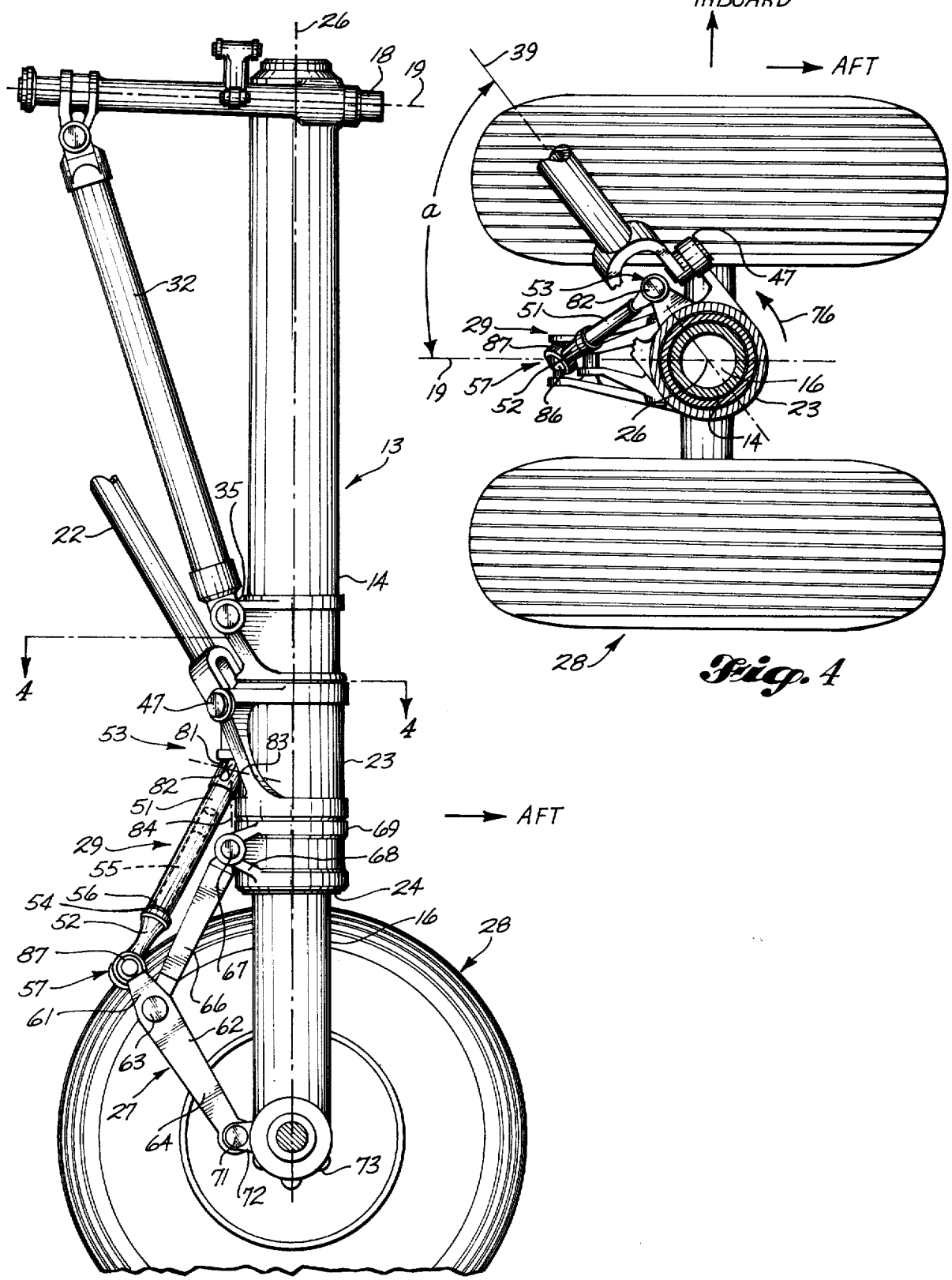

APPARATUS FOR SHORTENING THE STRUT OF A PIVOTALLY RETRACTABLE AIRCRAFT LANDING GEAR DURING GEAR RETRACTION

BACKGROUND OF THE INVENTION

In general, the present invention relates to retractable aircraft landing gears and more particularly, to a landing gear of the type that includes an elongate shock strut having an upper end pivotally mounted to the aircraft frame about a retraction axis for pivotal displacement between a vertical, downwardly extending, landing and ground support position and a horizontal, retracted position nested within a landing gear well provided in a lower surface of the aircraft wing or fuselage.

In such landing gears, the shock strut is provided by telescopically disposed cylinder and piston members defining an internal pneumatic spring chamber. Air pressure within the chamber biases the strut toward a telescopically extended state. When landing or at rest on the ground, the weight of the aircraft on the landing gear compresses the air spring, forcing the strut to a relatively shortened state which may be a number of inches shorter than the extended state. With the aircraft airborne and the landing gears down, the unloaded gears and associated shock struts assume their fully extended state. Thus extended, the gears are rotated into the retracted position to reside within the wheel wells.

Although aircraft have heretofore been designed to accommodate the full, extended strut length when the landing gears are retracted, such a configuration does not always permit the most advantageous placement of the supporting structure for the gears. For example, landing gears are usually supported by mounts on the underside of the wings, and are rotatively retracted in a direction inboard, toward wheel wells disposed in the lower surface of the fuselage. As the length of the landing gears is increased, for example to achieve greater ground clearance during landing, it may be necessary to dispose the pivotal supports for the gears at increasingly greater outboard positions on the wings, where the wing structure is not as strong, in order to fit the strut and attached wheel assemblies within the wheel wells.

SUMMARY OF THE INVENTION AND ITS OBJECTIVES

Accordingly, one object of the present invention is to provide a mechanism in a retractable landing gear for shortening the length of the shock strut in order that the gear, including the wheel assembly, can be accommodated in the limited wheel well space.

Another object of the present invention is to provide a mechanism for shortening the shock strut length, during gear retraction, for a landing gear that has been increased in length to provide increased ground clearance in the gear down position. A related object is to provide such a mechanism in order that the preexisting landing gear mounting points and wheel well dimensions, designed for a shorter length gear, can be utilized without modification, for the lengthened strut.

Still a further object of the present invention is to provide a reliable, light-weight mechanism in a retractable landing gear for shortening the shock strut length when in the retracted configuration, and which: utilizes the existing gear-to-frame mounting points; does not involve any modifications or connections to the existing hydraulic and pneumatic systems of the shock strut; and employs only passive, mechanical components.

Briefly, these objects are achieved by the present invention in a pivotally retractable landing gear assembly of the type including an elongate, piston-cylinder shock strut having one end pivotally mounted to the underside of an aircraft wing or body for pivotal movement between a generally vertical, down position for landing and ground support, and a generally horizontal, retracted position. The piston-cylinder strut is telescopically compressed and thus shortened by a mechanism that reacts to the rotative retraction of the strut (movement from the down position to the retracted position) and which includes a collar rotatably, coaxially mounted on the strut cylinder, a collapsible brace that has one end pivotally connected to the collar and has another end pivotally connected to a support point on the underside of the wing or body and which is offset or skewed to one side of the plane of rotation of the strut, and linkage means connected between the collar and the strut piston. As the strut is rotatively retracted the brace (after being unlocked from a straightened, bracing configuration) collapses toward a more compact configuration in order to accommodate a decreasing distance between the ends of the brace as the collar on the strut moves generally, albeit in a skewed motion, toward the brace support point on the wing or body. Because of the skewed mounting of the brace it acts, during the retraction, to apply a rotative force to the collar, rotating the collar about the axis of the strut. The linkage means includes a reactive linkage connected between the collar and a modified torque linkage (that interconnects the piston and cylinder of the strut), and serves to convert the rotation of the collar into a force moment applied to one of the links of the torque linkage for telescopically compressing the strut piston into the strut cylinder, thereby shortening the strut as the gear assembly is retracted.

The collapsible brace may be a foldable, sectional brace of the type disclosed in my earlier U.S. Pat. No. 3,086,733 issued on Apr. 23, 1963, for a "Retractable Landing Gear" in which a pair of end-to-end articulated brace sections assume a locked, straightened configuration to brace the strut in its down position. During retraction, the brace sections (after being unlocked) fold toward a collapsed, compact configuration, while the skewed mounting effects rotation of a collar that is similar to the collar used in the present invention. However, the collar in my earlier patent is nonrotatably connected to the strut piston for causing the piston and collar to rotate as a unit relative to the strut cylinder in order to rotate a wheel assembly attached to the lower end of the strut piston through a quarter turn during gear retraction, for a more compact wheel storage orientation. In the present invention, the piston and cylinder are nonrotatably interconnected by the torque linkage, and the collar rotates relative to both the piston and cylinder to enable the above-mentioned reactive linkage to apply a telescopic compression force on the piston and cylinder to shorten the strut.

In the preferred form of the invention, the shock strut includes spring means, such as an internal compressible pneumatic spring system coacting with the reciprocation of the piston and cylinder members, for continuously urging the strut to its maximum extension. The resiliency of the compressible gas, usually air, permits partial telescopic compression of the strut in reaction to axial loads during landing and when the aircraft is at rest on the ground. After takeoff, the unloaded landing gear, yields to the urging of the air spring force, extending the gear to its maximum extension. In order to compress or shorten the strut (during retraction) from a condition of maximum extension, the air spring force is overcome by the above mentioned telescopic compression force applied by the reactive linkage means in response to rotation of the collar during gear retraction. The shock strut is thus shortened, as the gear, including the wheel assembly, travels toward and into the wheel well of aircraft.

In preparation for landing, as each gear assembly is moved to the down position, a reverse rotation of the collar, by the foldable brace, displaces the reactive linkage means to a position that allows the shock strut to lengthen under the urging of the spring force. This returns the strut to its maximum length in preparation for landing. The reactive linkage means applies the desired telescopic compression force to the piston and cylinder members during the gear retraction movement only, and after the landing gear is in the down position, this linkage is effectively disengaged to permit the shock strut to respond in a normal manner to the externally applied shock loads and to the internal spring force.

These and further features, objects and various advantages of the invention will become apparent to those skilled in the art from a consideration of the following detailed description and appended drawings of an exemplary embodiment thereof.

BRIEF DESCRIPTION OF THE DRAWINGS

FIG. 3 is an enlarged elevational view, partly in section, of the landing gear shown in FIG. 1 as viewed from section lines 3—3 therein.

FIG. 4 is a transverse sectional view of the assembly taken generally along section lines 4—4 of FIG. 3.

DESCRIPTION OF THE PREFERRED EMBODIMENT

Figure 1:
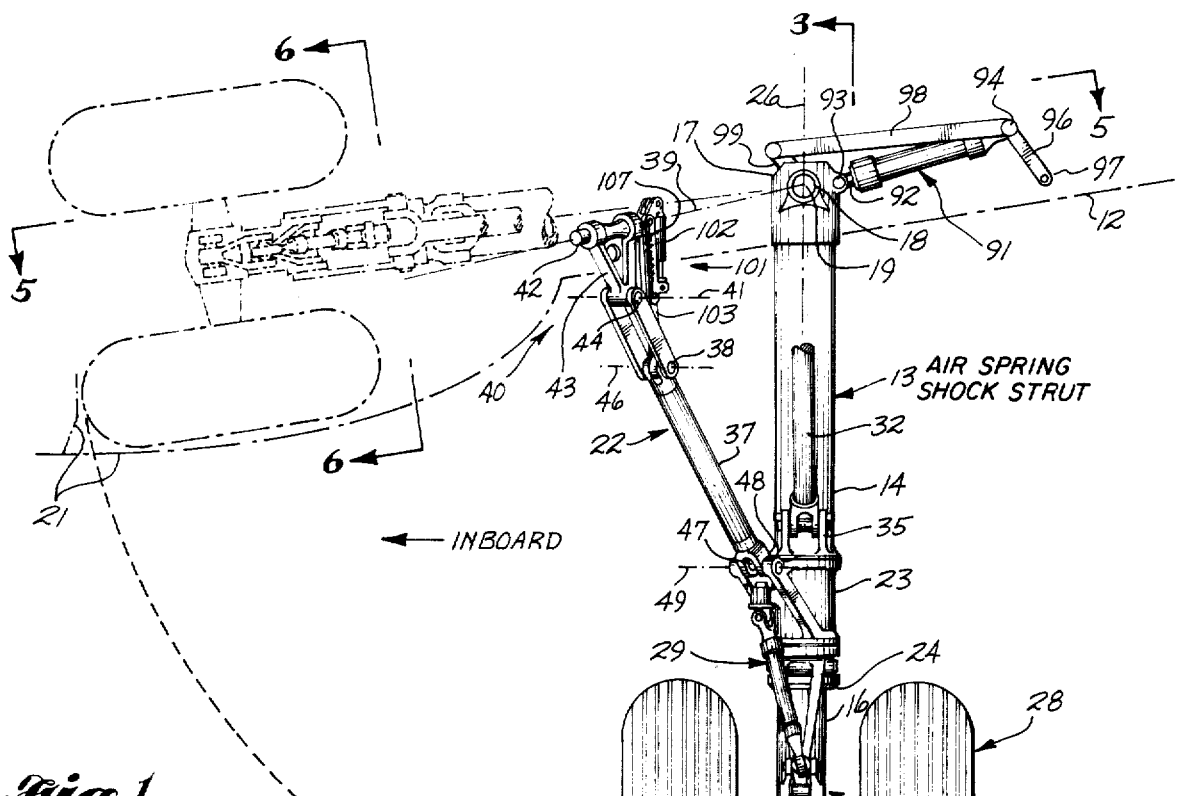
FIG. 1 is an elevational view of the retractable landing gear assembly in accordance with the present invention, looking aft, wherein the aircraft frame is shown in phantom and the landing gear is depicted in an unloaded condition, occurring for example after take-off and prior to retraction; also a moved, retracted position of the landing gear is illustrated in FIG. 1 by the broken lines.
Figure 2:
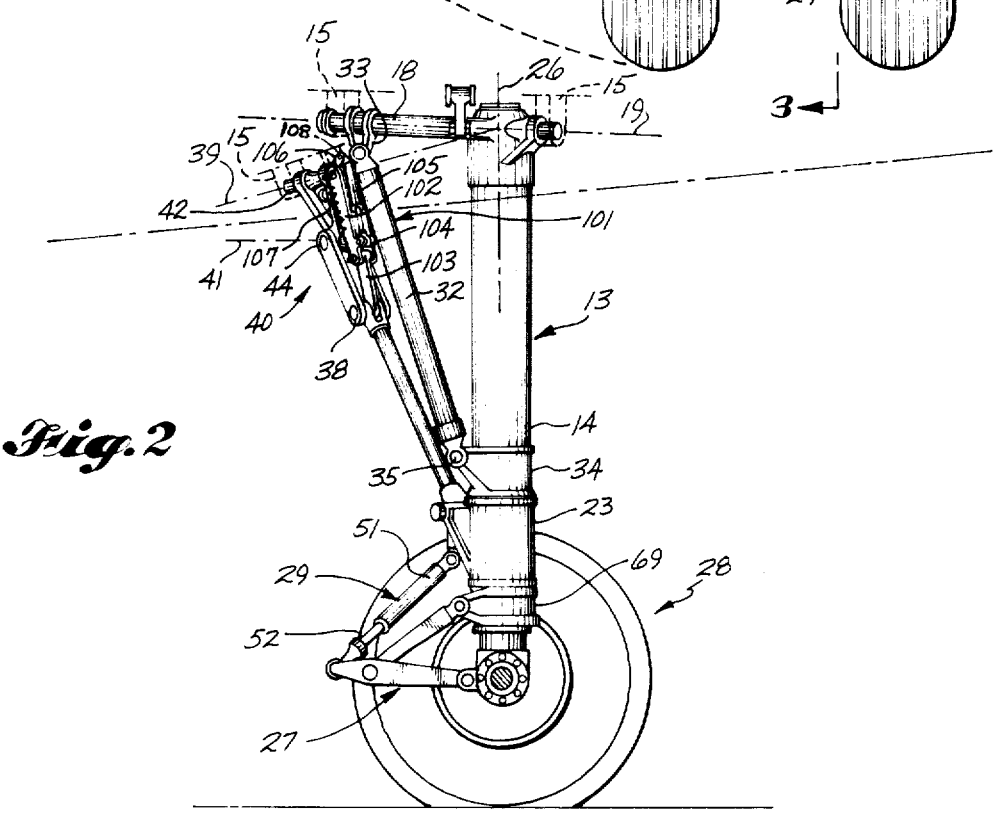
FIG. 2 is another elevational view of the retractable landing gear in accordance with the present invention, looking inboard of the aircraft, with the outboard wheel of the landing gear removed for clarity, and in which the landing gear is in a loaded condition with the weight of the aircraft bearing thereon.

With reference to FIGS. 1 and 2, the present invention is embodied in a retractable landing gear assembly 11 mounted to and carried by a gear supporting structure on an aircraft wing. The supporting stucture and associated mounts 15 (shown in phantom in FIG. 2) are known per se and for this reason have not been illustrated in detail. For the same reason, the wing 12 and wheel well 21 are shown only in phantom.

Assembly 11 includes an elongate shock strut 13 having telescopically disposed cylinder and piston members 14 and 16, respectively. One end 17 of the cylinder member is affixed to a transverse shaft 18 pivotally mounted to the underside of wing 12 and defining a retraction axis 19 for the strut 13, as best shown in FIG. 2. From a generally vertical, down position, strut 13 is rotatable or pivotable about axis 19, such that the lower end of the strut can be swung inboard toward and into wheel well 21, with assembly 11 thereby assuming a generally horizontal, retracted position as shown by the broken line position in FIG. 1. When in the down position, the strut is braced by a collapsible brace 22, formed by a pair of end-to-end articulated sections that fold to collapse the brace. One end of the brace is pivotally connected to a collar 23 that in turn is coaxially, rotatably mounted on cylinder member 14 at a fixed axial position intermediate the cylinder ends. The opposite end of the brace is pivotally connected to the mounts on wing 12 at a point generally inboard and forward of pivoted end 17 of the strut cylinder, and thus located out of the plane of rotation of strut 13.

Figure 5:
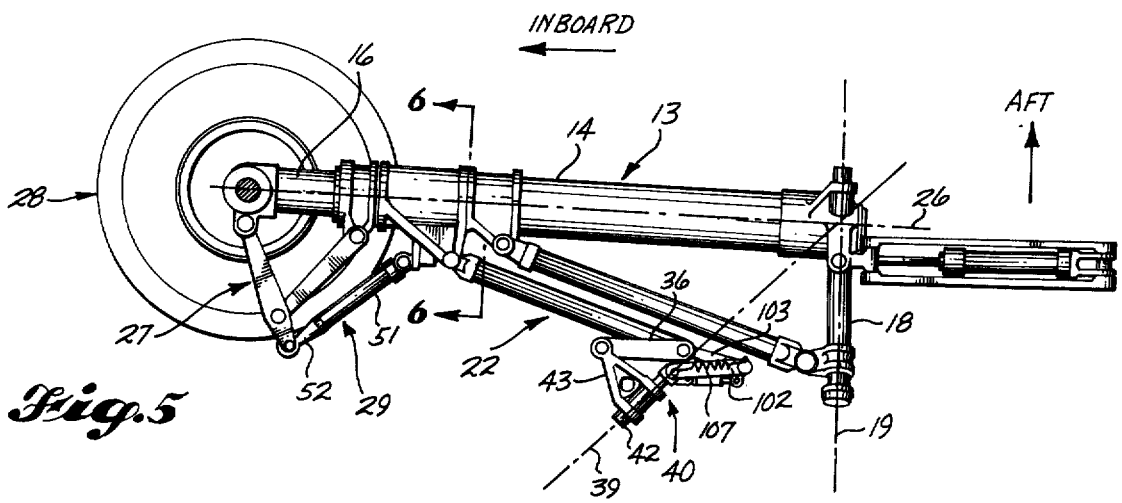
FIG. 5 is a plan view, partly in section, of the landing gear assembly in its retracted position, and when viewed as indicated by section lines 5—5 in FIG. 1.

During rotation of assembly 11 from the down position to the retracted position, the pivots at the ends of brace 22 and a pivotal joint interconnecting the ends of the articulated brace sections allow it to fold (after being unlocked as described herein) from a generally straightened, locked bracing configuration as shown in FIG. 1 to a collapsed, folded position as it is shown in FIG. 5 and in which the gear has been fully retracted. Moreover, the location of the wing mounted end of brace 22 (out of the plane of strut rotation) results in a skewed geometrical orientation of the brace that is effective to apply a rotative force to collar 23 to rotate it about the axis of the strut as the strut travels between its down position and its retracted position. This reactive rotation of collar 23 is essentially the same as the operation of the mechanism disclosed in my previous U.S. Pat. No. 3,086,733 (the disclosure of which is expressly incorporated herein by reference) in which the collar rotation therein causes rotation of the wheel assembly about the axis of the strut during gear retraction.

In the present invention, however, collar 23 does not rotate the wheel assembly as will be seen from the following description. A torque linkage 27 interconnects the cylinder and piston members 14 and 16, and serves to maintain proper angular alignment of wheel assembly 28 relative to the aircraft frame by preventing relative rotation between the piston member 16 (to which the wheel assembly is affixed) and cylinder member 13, and yet does not restrict normal telescopic reciprocation of the piston member within the cylinder. Connected between collar 23 and torque linkage 27, is a special reactive linkage means indicated at 29, for converting the rotation of collar 23 that occurs during rotative retraction of strut 13, into a force, bearing on the torque linkage 27 in a manner that telescopically compresses piston member 16 into cylinder member 14. This telescopic compression is effected against a counteracting spring force associated with the shock strut 13 tending to urge piston member 16 to a position of maximum extension (in this particular embodiment, the spring force is provided by an internal pneumatic system in which a variable volume chamber of compressible gas, such as air coacts with the reciprocation of piston member 16 within cylinder member 14). By utilizing the rotation of collar 23 produced by the skewed mounting of brace 22, to compress (by linkage means 29) the piston member against the pneumatic spring force, the overall length of strut 13 between the wheel assembly 28 and the retraction axis 19 is significantly shortened during retraction, thereby reducing the overall storage length of the assembly in its retracted position. With a wheel well 21 of limited dimensions, an otherwise incompatably long landing gear can be automatically shortened and received within the wheel well, while using the existing gear mounting points on wing 12. The reduction in the length of strut 13 is illustrated by the dotted line retraction arc 31 (FIG. 1) having a decreasing radius between the vertical, down position of the strut and the horizontal, retracted position.

Pivot shaft 18 (FIGS. 1 and 2) extends substantially transversely to the longitudinal dimension of strut 13 and is journaled in suitable mounts 15 carried by the supporting frame of wing 12. The orientation of retraction axis 19, defined by the mounting of shaft 18, is generally horizontal and extends fore-aft of the aircraft. A drag brace 32 may be fixedly mounted between a longitudinally intermediate position on cylinder member 14 and a point on shaft 18 spaced apart from cylinder end 17 to provide additional bracing for the strut 13 in its down position. Strut 13 and brace 32 rotate about retraction axis 19 as a unit. A fixed lug 33 attaches an upper end of brace 32 to shaft 18 and a nonrotatable, axially fixed collar 34 on cylinder member 14 has a lug 35 connected to the lower end of brace 32. Collar 34 also serves as an upper axial restraint for axially positioning rotatable collar 23 on cylinder member 14.

Brace 22 (FIG. 1) includes an upper link section 36 and a lower link section 37, the adjacent ends of which are joined by a pivot 38. In the gear down position, these sections assume a generally straight, aligned configuration. Upper section 36 is connected to wing 12 by a double articulated joint 40 including a first pivot axis 39 and a second pivot axis 41. Pivot axis 39 is defined by a pivot pin 42 adapted to the journaled in suitable supporting mount 15 (FIG. 2) carried by wing 12. A swivel member 43 is mounted on pin 42. Another pivot pin 44 defining the second pivot axis 41 of joint 40 is journaled in member 43. Additionally, the pivot 38 interconnecting brace sections 36 and 37 defines a pivot axis 46, while a pivot joint 47 connecting a lower end of brace section 37 to a lug 48 of collar 23 defines a still further pivot axis 49. The skewed location of joint 40 relative to the plane of rotation of strut 13 and the orientation of the various axes associated with brace 22, to cause a partial circumferential rotation of collar 23 as strut 13 is retracted about retraction axis 19. Also during this retraction brace 22 is folded about pivot 38 to accommodate the decreasing distance between the ends of the brace 22 as collar 23 travels generally toward (but off to one side of) joint 40. As the brace folds, pivot 38 moves generally toward strut 13, with a reverse movement away from the strut when the brace is being unfolded.

Axes 39 and 41 of the double articulated joint 40 are arranged so as to be substantially transverse to one another such that the upper brace section 36 has freedom of motion in two dimensions. Joint 40 is mounted to the aircraft wing at a position out of the plane of rotation of strut 13 and in this embodiment inboard and forward of the pivoted end of strut 13 (FIG. 5). The projection of axis 39 of pin 42 is arranged to substantially intersect the retraction axis 19 at a point where the centerline 26 of the strut 13 intersects axis 19. The axes 41, 46 and 49 of pivot joints 44, 38 and 47 are disposed substantially parallel to each other and generally transverse to a plane defined by axis 39 and strut centerline 26 such that brace sections 36 and 37 pivot on parallel axes during the folding movement and are effective to apply torque to collar 23 for rotating it about its axis, i.e., the strut centerline 26.

Axis 39 intercepts retraction axis 19 at a predetermined oblique angle, selected in accordance with the desired amount of rotation to be imparted to collar 23. This orientation is indicated in FIG. 4 wherein angle $a$ corresponds to the oblique angle of interception of pivot axis 39 with retraction axis 18. When the assembly is rotated to the retracted position, angle $a$ is closed as depicted in FIG. 6, with the mounting point of the double articulated joint 40 of brace 22 assuming a position within or proximate to the plane defined by the retraction axis 19 and the strut centerline 26.

Figure 6:
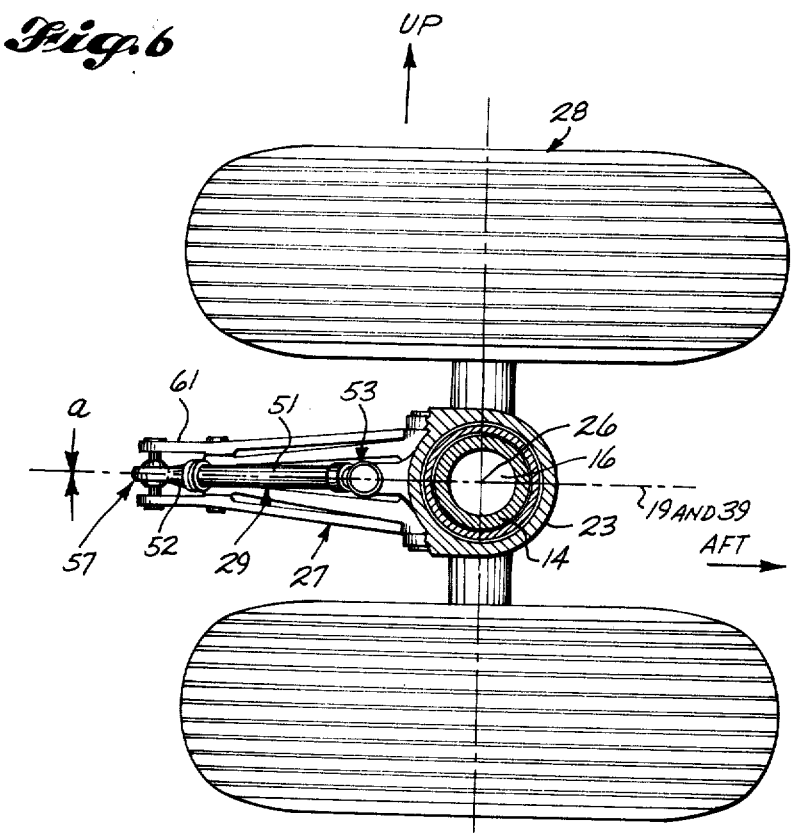
FIG. 6 is a transverse sectional view, similar to FIG. 4, taken generally along section lines 6—6 of FIG. 5, and by comparison with FIG. 4, illustrates the rotation of certain components of the landing gear assembly when moved between its down position and its retracted position.

This operation is best understood by comparing FIGS. 3 and 4 showing the assembly in the down position, with FIGS. 5 and 6 illustrating the orientation of the parts in the retracted position. The skewed mounting point of joint 40 is selected in this instance to provide an angle of rotation of collar 23 of approximately 45°. This angle has been found adequate for effecting sufficient displacement of the torque linkage 27 by the reactive linkage means 29, given the magnitudes of the forces and rotational movements thereof, to shorten strut 13 by several inches.

Reactive linkage means 29 (FIGS. 3-5) is provided by telescopically disposed members 51 and 52 in which member 51 is of a generally tubular configuration having one of its ends connected to collar 23 by a pivot 53 and is open at the other end 54 to telescopically receive therewithin an elongate circular cross section portion 55 of member 52. End 54 of member 51 axially abuts a circumferential shoulder 56 provided on member 52 intermediate the ends thereof to limit further inward telescoping and to thus define a minimum length configuration of linkage means 29, with the members 51 and 52 being freely telescopically extendable therefrom to accommodate increasing separation between pivot 53 on collar 23 and another pivot 57 connecting an end of member 52 to torque linkage 27.

Torque linkage 27 (FIG. 3) is modified (with respect to conventional torque linkage) by providing link 62, connected to piston 16, with a lever extension portion 61. Portion 61 extends outboard of the knuckle or apex pivot 63 of the torque linkage and is generally aligned with the main body portion 64 of link 62. The other torque link 66 is connected at one of its ends to cylinder member 14 by means of a pivot 67 journaled in a lug 68 on an axially fixed, nonrotatable collar 69 disposed on an end 24 of the cylinder member 14. Collar 69 also serves as a lower axial restraint for rotatable collar 23. The opposite end of link 66 is connected to member 62 at apex pivot 63. Link 62 is similarly connected by a pivot 71 to a lug 72 nonslidingly, nonrotatably affixed to a lower end 73 of piston member 16 adjacent the axle for wheel assembly 28. Apart from the addition of extended portion 61 and its coaction with the reactive linkage means 29, torque linkage 27 functions in the usual manner to prevent relative rotation between the piston and cylinder members and yet permit longitudinal reciprocation therebetween.

With the unweighting of the gear assembly after take-off, and prior to gear retraction, strut 13 assumes a configuration as shown in FIG. 3 in that piston member 16 is outwardly telescoped to its maximum extension by the weight of wheel assembly 28 and by the internal air spring bias. As a result, torque linkage 27 is angularly spread to an open position, corresponding to a maximum separation between cylinder and piston pivots 67 and 71. This causes link 62 to be rotated clockwise, as shown in FIG. 3, about apex pivot 63. Pivot joint 57 is thereby displaced generally upwardly toward collar 23 reducing the distance between joint 57 and joint 53 and collapsing linkage 29 to its minimum length configuration. When collapsed to this minimum length configuration, the length of the linkage is now fixed so that the linkage can assume a force transmitting, compression mode that enables it to compressively transmit a force between joints 53 and 57.

As retraction of strut 13 about shaft 18 commences, the articulation of sectional brace 22 rotates collar 23 counterclockwise in the direction of arrow 76 as shown in FIG. 4, resulting in a rotation of joint 53 in a direction that decreases the separation between joints 53 and 57. Linkage means 29 reactively forces pivot joint 57 generally downwardly away from cylinder member 14. This results in the application of a force moment to link 62 of torque linkage 27, tending to rotate link 62 about pivot 63. The end of member 62, connected to lug 72 by pivot 71, is thereby forced upwardly, telescopically compressing piston member 16 into cylinder member 14.

The necessary freedom of movement of linkage means 29, for converting the rotation of collar 23 into the force moment applied to torque linkage link 62, is provided by a double articulated joint 53 including pivots 81 and 82 defining orthogonally disposed pivot axes 83 and 84 respectively, permitting articulation of member 51 in any two orthogonal planes intersecting at joint 53. Similarly, joint 57 is provided by a ball and socket swivel including ball portion 86 carried by opposed trunions at a bifurcated end of extended portion 61 of arm 62, and an annular socket portion 87 carried in a fitting rigidly affixed to the end of member 52 (FIGS. 3 and 4). In this manner, member 52 is also free to move in any two orthogonal planes intersecting at joint 57.

In constructing reactive linkage means 29, the minimum length thereof should match the distance between pivot joints 53 and 57 when the landing gear is down, unloaded and thus at its maximum extension. With reference to FIG. 3, it will be observed that in this configuration, any axial compression force externally applied to the strut will telescopically compress piston member 16 inwardly and extend linkage means 29. Once the reactive linkage means has been extended from its minimum length configuration, it assumes a variable length, non-restraint mode in which it is freely extendable and collapsible, i.e., disengaged from torque linkage 27, allowing piston member 16 freedom to reciprocate incylinder member 14 as necessary to absorb the forces associated with landing and ground taxiing.

Retraction of the landing gear assembly is effected by a hydraulic cylinder assembly 91 including a piston rod 92 connected lengthwise between a lug 93 on strut 13 and a floating pivot 94. A link 96 is pivotally connected at one end to pivot 94 and is adapted at its opposite end 97 for pivotal connection to the supporting frame of wing 12 in order to guide pivot 94 in a fixed plane. A link 98 is connected between pivot 94 and another lug 99 on strut 13. Lugs 93 and 99 are arranged with respect to retraction axis 19 to apply force moments to strut 13 rotating the strut clockwise when the cylinder and piston assembly 91 is extended in compression between lug 93 and floating pivot 94. During retraction, link 98 is in tension and the cylinder piston assembly are in compression. To move the landing gear assembly to its down position, the cylinder and piston assembly 91 is retracted, placing it in tension so as to pull lug 93 counterclockwise about the retraction axis, simultaneously causing link 98 to assume a compression mode that pushes lug 99 in a counterclockwise rotation.

To lock brace 22 (FIG. 2) in its straightened, bracing configuration when the gear is down, a spring biased, hydraulically actuated, overcenter toggle locking mechanism 101 is provided including toggle links 102 and 103 interconnected by a toggle pivot 104, a hydraulic lock/unlock actuator 105, and a biasing 107. One of the remote ends of the toggle links, here an end of link 103, is connected to pivot 38 that interconnects the ends of brace sections 36 and 37, while the other remote end of the links, here an end of link 102, is connected to an additional pivot 106 carried by a lug on pin 42 of the double articulated joint 40, with pivot 106 having an axis parallel to pivots 104 and 38. Spring 107 establishes two stable configurations for the toggle linkage 101: an unlocked position in which links 102 and 103 are folded, corresponding to the retracted position of the landing gear (FIG. 5); and an overcenter locked position in which the toggle links are articulated from the folded unlocked position through a substantially aligned, straightened configuration into an overcenter position (FIGS. 1 and 2) at which stops (not shown) provided on links 102 and 103 adjacent joint 104 limit further application. In the latter configuration, the toggle mechanism 101 positions and holds pivot 38 of the sectional brace 22 in a fixed overcenter position corresponding to the straightened bracing configuration discussed above. Actuator 105 is connected between toggle joint 104 of links 102 and 103 and a point on lug 108 outboard of pivot 106, so that a controlled elongation of actuator 105 forces joint 104 into the overcenter locked position (when the gear assembly has been placed in the down position), while a contraction of actuator 105 pulls joint 104 out of the overcenter position, thus unlocking links 102 and 103 and initiating the folding of brace 22 at a pivot 38.

While only a limited number of particular embodiments of the present invention have been disclosed herein, it will be readily apparent to persons skilled in the art that numerous changes and modifications may be made thereto without departing from the spirit of the invention. For example, in the above described embodiment, brace 22 collapses during strut retraction by means of foldable, articulated sections. However, the collapsing of the brace to accommodate the decreasing separation between the collar 23 and a swivel joint, such as joint 40, may be in some cases provided by telescoping members that are lockable in an extended position to brace the strut and are unlockable to telescopically collapse during strut retraction, and at the same time effect the rotation of the collar by reason of the skewed geometric orientation.

Also, in this embodiment, collar 23 has an axis of rotation that is coincident with the centerline 23 of strut 13. However, other pivotal or rotatable means may be employed in lieu of collar 23, and the axis or rotation thereof need not be coincident with the strut centerline. For example, any means rotating about an axis generally parallel to the strut and axially restrained with respect to cylinder member 14, may be utilized as a mounting point for brace pivot 47 and for reactive linkage pivot 53. So long as these pivotal joints are mounted to a means that rotates in an arc adjacent to the strut cylinder member 14 and about an axis generally parallel to the strut, the necessary differential movement between the pivoted ends of the reactive linkage means 29 will occur during gear retraction, forcing linkage means 29 and torque linkage 27 to telescopically compress the cylinder and piston members.

Additionally, although reactive linkage means 29 is preferably of a minimum length, compression type, an alternative embodiment may provide a longitudinally extendable tension linkage having a maximum length configuration and connected to the torque linkage member 62 intermediate pivot 71 and apex pivot 63. The upper end of such linkage would be connected to the collar at a point that rotates away from the point of connection to member 62 during retraction, so that the linkage is extended to its maximum length where it assumes a tension mode that applies a counterclockwise directed force moment to the link member 62. This will rotate member 62 in a counterclockwise sense as seen in FIG. 3 thereby compressing the piston into the strut cylinder.

Accordingly, the foregoing disclosure and description are for illustrative purposes only and do not in any way limit the invention which is defined only by the following claims.

I claim:

1. A retractable aircraft landing gear assembly comprising:
    a short strut including telescopically coacting first and second members, said strut having one end pivotally mounted to a strut support on an aircraft for rotative retraction of the strut between a generally downwardly extending ground support position, and an out-of-the-way retracted position;
    rotatable means mounted for rotation on said first member about an axis of rotation generally parallel to the longitudinal dimension of said strut and at a location spaced from the pivotally mounted end of said strut;
    an elongate, collapsible brace means having opposed ends separately, pivotally connected to said rotatable means and to a brace support on such aircraft, respectively, said brace means coacting with said strut to assume an uncollapsed strut bracing configuration when said strut is in said downwardly extending position and to assume a collapsed nonbracing configuration when said strut has been moved to its retracted position, said brace support being located to one side of the plane of rotation of said strut so that said brace means has a skewed orientation with respect to said plane of rotation and so that when said strut is moved from said downwardly extending position to said retracted position said brace means effects rotation of said rotatable means; and
    linkage means connected between said rotatable means and said second member for mechanically converting said rotation of said rotatable means into inward telescoping of said members to shorten said strut during its retraction.

2. The landing gear assembly set forth in claim 1, wherein said shock strut includes spring means coacting with said members for resiliently biasing said strut toward a telescopically extended condition, and said linkage means being operative to effect said inward telescoping of said members against the bias of said spring means.

3. The landing gear assembly set forth in claim 1, wherein said first member is a cylinder and said second member is a piston, and said linkage means comprises:
    torque linkage means including articulated links interconnecting said members for preventing relative rotation thereof and allowing telescopic reciprocation therebetween, said links being articulatable between first and second relative angular configurations correlatively with the reciprocation of said members between telescopically extended and telescopically shortened conditions, respectively; and
    reactive linkage means connected between said rotatable means and said torque linkage means and being responsive to rotation of said rotatable means during retraction of said strut for displacing said links of said torque linkage means toward said second angular configuration, thereby effecting said inward telescoping of said members.

4. The landing gear assembly of claim 3, wherein said strut includes spring means coating with said members for resiliently biasing said members in said extended condition, and wherein said reactive linkage means is constructed so that when said strut is moved to said downwardly extending position said reactive linkage means is freely extendable and collapsible so that its length is variable to permit unrestrained articulation of said torque linkage means between said first and second angular configurations, and wherein said reactive linkage means includes means that limits variation of its length when said rotatable means is rotated during retraction of said strut to cause said reactive linkage means to assume a fixed length that is effective to transmit a force between said rotatable means and said torque linkage means so as to displace said links of said torque linkage means toward said second angular configuration to cause said inward telescoping of said members against the biasing of said spring means.

5. The landing gear assembly of claim 4, wherein a first of said links of said torque linkage means has one end pivotally connected to said first member and a second of said links has one of its ends pivotally connected to said second member, the axes of said pivotal connections of said first and second links being parallel to one another and transverse to the longitudinal dimension of said strut, said links being interconnected at a pivotal joint located intermediate the ends of said second link and said pivotal joint having an axis parallel to the above-mentioned axes of said pivotal connections to said first and second members, said reactive linkage means being connected between said rotatable means and a point on said second link outboard of said pivotal joint from said strut, said means that limits variation of the length of said reactive linkage means being constructed to limit the minimum length to which said reactive linkage means is collapsed when said rotatable means is rotated during retraction of said strut so that said reactive linkage means acts in compression between said rotatable means and said second link that articulates said torque linkage means toward said second angular configuration.

6. In a retractable aircraft landing gear assembly, including a landing gear supporting structure; an elongate shock strut that is pivotally mounted to said supporting structure for pivotal movement between a generally downwardly extending position and an out-of-the-way retracted position, said strut including telescopically reciprocatively coacting cylinder and piston members; torque linkage means interconnecting said cylinder and piston members and having first and second angular configurations corresponding to telescopically extended and compressed conditions of said strut, respectively; collar means coaxially mounted on one of said members intermediate the ends of said strut for rotation about a longitudinal centerline of said strut; a foldable, sectional brace means having opposed ends, separately, pivotally connected to said collar means and to said supporting structure, respectively, and having a straightened, strut bracing configuration when said strut is in said downwardly extending position and having a folded, non-bracing configuration when said strut has been moved to its retracted position, the pivotal connection of the end of said brace means to said supporting structure being disposed out of the plane of rotation that is defined by said strut when it is pivotally moved between said downwardly extending and retracted positions so that said brace means effects rotation of said collar means in reaction to said pivotal movement of said strut, wherein the improvement comprises:

reactive linkage means connected between said collar means and said torque linkage means and being responsive to rotation of said collar means effected by said brace means when said strut is pivotally moved from said downwardly extending position toward said retracted position for displacing said torque linkage means from said first angular configuration toward said second configuration, whereby said piston and cylinder members are inwardly telescoped to shorten said strut during its retraction.

7. A retractable aircraft landing gear assembly for use with an airplane comprising:

a strut having a longitudinal dimension and having first and second telescopically engaged members, said first member being mounted to a strut support on said aircraft for swinging movement between a generally downwardly extending position and a retracted position;

rotatable means mounted on said first member for rotation about an axis extending longitudinally of said strut, said rotatable means being rotatable between a first position and a second position;

linkage means coupling said second member to said rotatable means for inwardly telescoping said second member into said first member in reaction to rotation of said rotatable means from said first position to said second position; and rotation effecting means cooperating with said rotatable means for rotating said rotatable means between said first and second positions in response to movement of said strut between said downwardly extending and retracted positions, said rotation effecting means positioning said rotatable means in said second position when said strut is in said retracted position.

* * * * *